United States Patent [19]

(12) United States Patent
Jaisimha et al.

(10) Patent No.: US 7,930,561 B1
(45) Date of Patent: *Apr. 19, 2011

(54) SYSTEM AND METHOD FOR REGULATING THE TRANSMISSION OF MEDIA DATA

(75) Inventors: Mysore Y. Jaisimha, Seattle, WA (US);
Phillip L. Barrett, Redmond, WA (US)

(73) Assignee: RealNetworks, Inc., Seattle, WA (US)

( * ) Notice: Subject to any disclaimer, the term of this patent is extended or adjusted under 35 U.S.C. 154(b) by 398 days.

This patent is subject to a terminal disclaimer.

(21) Appl. No.: 11/881,693

(22) Filed: Jul. 26, 2007

Related U.S. Application Data

(63) Continuation of application No. 11/105,305, filed on Apr. 13, 2005, now abandoned, which is a continuation of application No. 10/690,736, filed on Oct. 21, 2003, now Pat. No. 6,934,837, which is a continuation of application No. 10/189,854, filed on Jul. 3, 2002, now Pat. No. 6,671,807, which is a continuation of application No. 09/175,208, filed on Oct. 19, 1998, now Pat. No. 6,487,663.

(51) Int. Cl.
*G06F 11/30* (2006.01)

(52) U.S. Cl. .................................................. 713/193

(58) Field of Classification Search ................. 713/193; 370/465; 705/51
See application file for complete search history.

(56) References Cited

U.S. PATENT DOCUMENTS 5,852,664 A * 12/1998 Iverson et al. .................. 705/51
6,134,243 A * 10/2000 Jones et al. .................... 370/465
6,671,807 B1 * 12/2003 Jaisimha et al. ............... 713/193

* cited by examiner

*Primary Examiner* — Benjamin E Lanier
*Assistant Examiner* — Samson Lemma
(74) *Attorney, Agent, or Firm* — Kory D. Christensen; Stoel Rives LLP

(57) ABSTRACT

A system and method regulate the transmission of media data. In accordance with one embodiment of the invention, a header portion of a media file is encoded to include an access code. The access code corresponds to one or more permitted methods by which the media file may be transmitted over a network. In one embodiment, a user operates a web browser to access a web page including a hyperlink which references the media file and specifies a desired type of transmission. Desired types of transmission include, for example, streaming transmission and faster than real time reliable download. When the hyperlink is activated, a web server sends a URL referencing the media file to the web browser. The web browser passes the URL to the media player. The media player requests the media file from a media server. The media server transmits the header of the media file, and the media player extracts the access code to determine whether the media file may be transmitted according to the desired type of transmission. If so, the media server transmits the media file using the desired type of transmission, and the media player renders the media data into video, sound or image signals. If the media player receives the media data using a type of transmission that permits storing the media data locally, the media player may transfer the media data to a portable media player.

22 Claims, 9 Drawing Sheets

SYSTEM AND METHOD FOR REGULATING THE TRANSMISSION OF MEDIA DATA

RELATED APPLICATIONS

This is a continuation of the prior application Ser. No. 11/105,305, filed 13 Apr. 2005 now abandoned; which is a continuation of Ser. No. 10/690,736 filed on Oct. 21, 2003, (now U.S. Pat. No. 6,934,837); which is a continuation of Ser. No. 10/189,854 filed Jul. 3, 2002 (now U.S. Pat. No. 6,671,807); which is a continuation of Ser. No. 09/175,208 filed Oct. 19, 1998 (now U.S. Pat. No. 6,487,663, the benefit of the filing dates of which are hereby claimed under 35 USC 120.

BACKGROUND OF THE INVENTION

1. Field of the Invention

This invention relates to the transmission of media data. More specifically, the invention provides a system and method for controlling the manner in which media data may be served over a network.

2. Description of the Related Art

The production and distribution of multimedia data, including video, audio and image data, is increasing at a phenomenal rate. Factors contributing to this explosion in the production and use of multimedia data include the growing popularity and capability of the Internet, the growing affordability of personal computers capable of efficiently processing multimedia data to provide a pleasing experience for users, as well as the fact that multimedia data is far superior to text-only data in conveying content-rich information naturally and intuitively. The great demand for multimedia data will only increase.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

Sometimes, a person using a web browser and possibly a media rendering plug-in accesses a media object (e.g., video clip, audio clip, image) on a web site by viewing or listening to the media object as it is being downloaded without ever storing the media object permanently on his or her computer. Other times, a user accesses a media object by downloading it and storing it on his or her computer in its entirety before viewing or listening to the object. A user who accesses a media object by downloading it in its entirety has the advantage of being able to view or listen to the object any number of times without ever having to connect again to a network. For a number of reasons, including encouraging users to repeatedly visit a web site, content providers need to regulate the type of access that users have to one, some or all media objects provided on a web site. Yet, currently, content providers have little ability to conveniently restrict users' access.

Media objects are typically stored as computer files. Thus, one way of restricting users' access to these media objects is to set up a username/password system. Besides presenting possibly prohibitive administrative overhead, such access restriction is undesirable because many users would be unwilling to visit a web site if they were forced to enter a username and password upon every visit.

While existing computer operating systems can, on a user-by-user basis, allow access to a file or prohibit access altogether, that functionality does not help a content provider control particular types of accesses to files. A computer's file systemXtypically a component of the operating systemXgenerally stores certain information about each file stored on the computer, such as, for example, file size and date and time of creation. Neither the size of a file, nor an associated date or time assists in controlling how a user may access a file. Thus, content providers cannot rely on functionality provided by a computer's operating system to control the ways in which a media object may be accessed.

As the demand for multimedia data grows, the multimedia content produced by content providers grows in value. Indeed, many content providers now charge a fee from users who wish to access their content. Content providers are increasingly concerned about the ways in which users are accessing the content and possible uses being made of the content. What content providers need is a convenient way of controlling the ways users can access media objects.

SUMMARY OF THE INVENTION

The present invention advantageously provides a system and method for conveniently and effectively regulating the ways users can access media objects.

One embodiment of the present invention is an access coded media file. The access coded media file comprises media data, and a header including access code bits, the access code bits representing a value indicating that the media data may be transmitted in accordance with at least one transmission protocol. An alternative aspect of the embodiment is one wherein the access code bits represent a value indicating that the media data may not be transmitted in accordance with at least one transmission protocol. A further aspect of the embodiment is one wherein the access code bits are encrypted and wherein the value is determined by decrypting the access code bits.

Another embodiment of the present invention is a method for regulating types of access to a media file. The method comprising the steps of (1) placing an access code in a media file, the media file stored in a media storage accessible by a media server, the media server connected to a network, the access code indicating that data in the media file may be transmitted in accordance with at least one permitted transmission protocol; (2) requesting the media file with a media player, the media player connected to the network, the request specifying an intended transmission protocol to use in transmitting the media file over the network in response to the request; (3) transmitting the access code to the media player with the media server; and (4) checking the access code with the media player to determine whether the intended transmission protocol is one of the at least one permitted transmission protocols. Another aspect of the embodiment further comprises encrypting the access code within the media file, and decrypting the access code with the media player to perform the checking.

Still another embodiment of the invention is a system for regulating the transmission of media data. The system comprises (1) a media file having media data and a header, the header including an access code corresponding to at least one permitted type of access to the media file; (2) a media server connected to a network and to media storage, the media file stored on the media storage, the media server responsive to a first request for the media file by transmitting the header, the media server responsive to a second request by transmitting the media data in accordance with one of the at least one permitted type of access; and (3) a media player connected to the network, the media player responsive to user input to transmit the first request to the media server, the media player receiving the header and extracting the access code from the header, the media player determining from the access code that the media file is enabled for one of the at least one permitted type of access, the media player transmitting the second request to the media server upon the determination. One aspect of the embodiment is one wherein the first request specifies the one of at least one permitted type of access. Another aspect of the embodiment is one wherein the one of at least one permitted type of access is a streaming transmission access. Still another aspect of the embodiment is one wherein the one of at least one permitted type of access is a faster than real time reliable transmission access. Yet another aspect of the embodiment is one wherein the one of at least one permitted type of access is simultaneous streaming and faster than real time transmission access. A further aspect of the embodiment is one wherein the permitted type of access includes recording media data to local storage. A still further aspect of the embodiment is one wherein the access code is encrypted and wherein the media player decrypts the access code.

A further embodiment of the invention is a method for controlling access to media data over a network. The method comprising the steps of (1) requesting remotely stored media data in accordance with a preferred transmission protocol; (2) receiving an access code corresponding with permitted transmission protocols, the access code stored within the media data; (3) determining whether the preferred transmission protocol is one of the permitted transmission protocols; and (4) receiving the media data in accordance with the preferred transmission protocol if the preferred transmission protocol is one of the permitted transmission protocols. In one aspect, the embodiment comprises the further step of receiving the media data in accordance with a default transmission protocol if the preferred transmission protocol is not one of the permitted transmission protocols. In another aspect, the embodiment comprises the further step of encrypting the access code.

A still further embodiment of the invention is a system for regulating access to media data. The system comprises (1) a media file having an embedded access code, the access code corresponding to at least one permitted type of transmission of the media file; (2) a web page having a hyperlink which references a network-based file which includes a reference to the media file; (3) a web browser displaying the web page, the web browser responsive to user activation of the hyperlink to transmit a request for the contents of the network-based file; (4) a web server responsive to the request for the contents to transmit the reference to the media file to the web browser; (5) a media player in communication with the web browser to receive the reference to the media file and to responsively transmit a request to a media server for the contents of the media file; and (6) a media server responsive to the request for the contents of the media file to transmit the access code to the media player, the media player determining from the access code whether a desired type of transmission of the media file is one of the permitted types of transmission. A further aspect of the embodiment is one wherein the reference to the media file indicates the desired type of transmission. Another aspect of the embodiment is one wherein the media server transmits the contents of the media file to the media player upon the media player's determination that the desired type of transmission is one of the permitted types of transmission. Yet another aspect of the embodiment is one wherein the desired type of transmission is a streaming transmission. Further aspects of the embodiment include one wherein the desired type of transmission is a faster than real time reliable transmission and one wherein the desired type of transmission is simultaneous streaming and faster than real time transmission.

Another embodiment of the invention is a method of encoding a media file to regulate transmission of the media file. The method comprises the steps of (1) prompting a user to select a transmission method; (2) calculating an access code corresponding to the selected transmission method; (3) opening a media file stored on a computer-readable medium; (4) placing the access code within the media file; and (5) storing the media file having the access code on the computer-readable medium. One aspect of the embodiment further comprises the step of encrypting the access code. Another aspect of the embodiment further comprises the step of combining the access code with extra bits and placing both the access code and the extra bits in the media file.

A further embodiment is a method for creating a coded media file configured for transmission, comprising: providing media data in a first computer-readable medium; providing code bits in a second computer-readable medium, the code bits representing a value indicating that the media data may be transmitted in accordance with at least one transmission protocol; and providing second data relating to rights, the second data relating to rights being provided as second code bits stored in a third computer-readable medium prior to a transmission of the media data.

DETAILED DESCRIPTION OF THE PREFERRED EMBODIMENT

Figure 1:
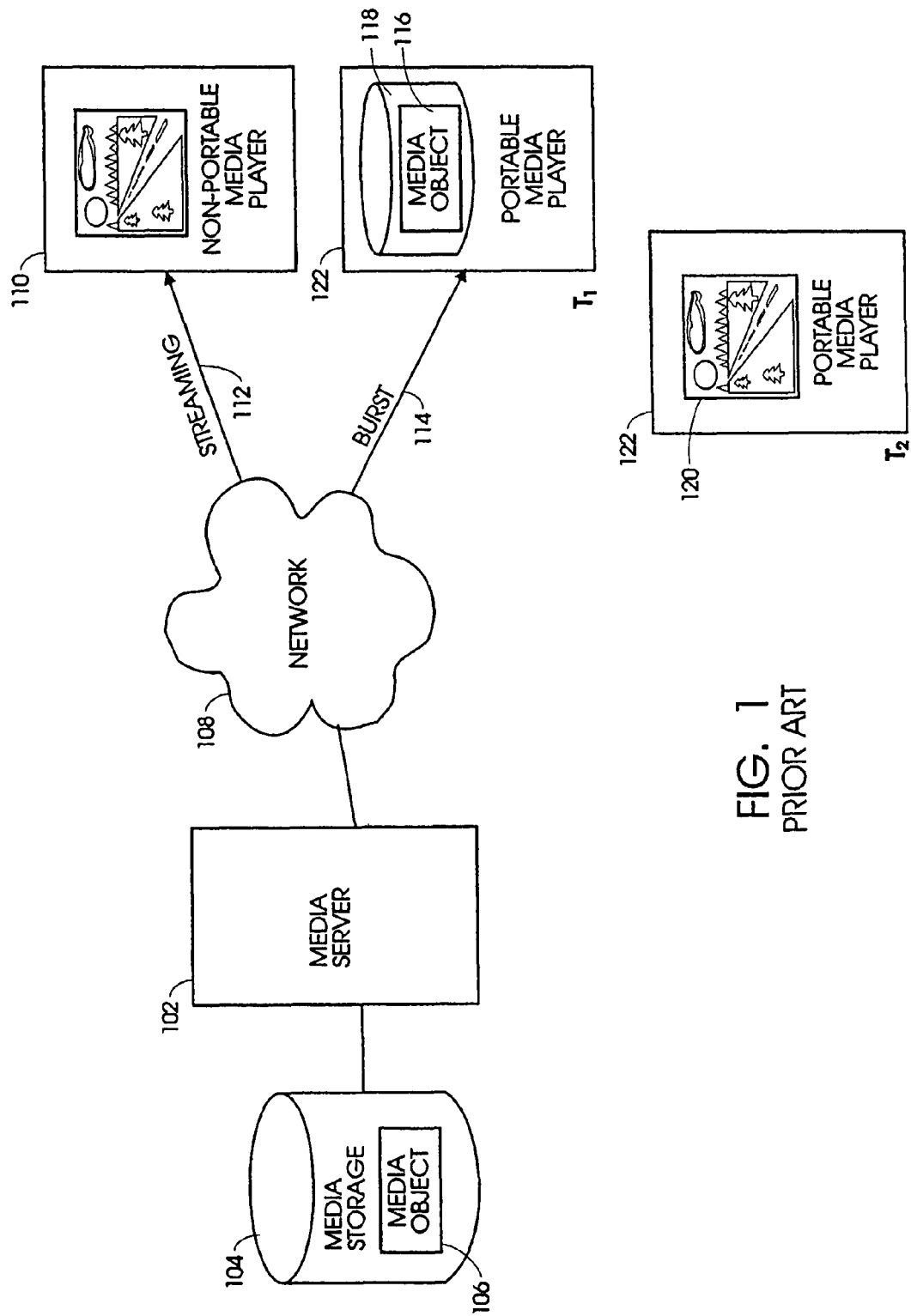
FIG. 1 illustrates a representation of an existing media distribution system.

FIG. 1 illustrates a representation of an existing media distribution system. A media server 102 accesses a media storage 104 to obtain media data representing a media object 106 such as, for example, a video clip, audio clip, or graphical image. The media server 102 transmits the media data via a network 108 to media receiving devices.

In some cases, a media receiving device receives media data representing a video or audio clip and plays the clip (e.g., decodes and renders audio and video information to produce video image frames as pixels on a computer screen and to produce audible sound of an accompanying soundtrack from a speaker connected to the computer) while the media data is being transmitted. This type of transmission of media data may be referred to as streaming. In a streaming transmission, media data is buffered temporarily by the media receiving device, processed by the device into video or audio information which is presented to the user, and the media data is never stored permanently on the computer.

In other cases, however, a media receiving device receives an entire video clip, audio clip, or image and stores it in a non-volatile memory. This type of transmission of media data may be referred to as "faster than real time reliable download" or FTRRD mode. Once a media object 106 has been transmitted in FTRRD mode, the user may then play the media object 106 at a later time regardless of whether the user is connected to a network. Such a user may also play the video or audio clip or view the image numerous times.

A non-portable media player 110 receives media data representing the media object 106 using a streaming transmission protocol 112. The non-portable media player cannot easily or conveniently be carried from place to place by a user. In accordance with the streaming transmission protocol 112, the non-portable media player 110 interprets the media data as it is received to provide, for example, a video display for a user of the non-portable media player 110. Generally, the non-portable media player discards the media data immediately after interpreting the data to create, for example, a video display, and does not store the media data in any non-volatile memory.

A portable media player 122 receives the media data using a FTRRD transmission method 114. The portable media player 122, at a time $T_1$, receives the media data and stores it in a media file 116 on a local, non-volatile memory 118. During receipt of the media data, the portable media player 122 does not interpret the media data or present it in any manner for user consumption. At a later time $T_2$, a user operates the portable media player 122 to open the media file 116 and to interpret the data in the media file 116 to create a presentation 120 of the media object 106.

Thus, existing systems such as that illustrated in FIG. 1 can transmit a media object such as, for example, a video clip, an audio clip, or graphical image, in accordance with a streaming protocol 112 or a FTRRD protocol 114. The streaming protocol 112 is useful for requesting and immediately playing a media object 106. The FTRRD transmission protocol 114 is useful for acquiring the entire content of a media object 106 for later play or presentation, particularly on a portable media player 122.

Figure 2:
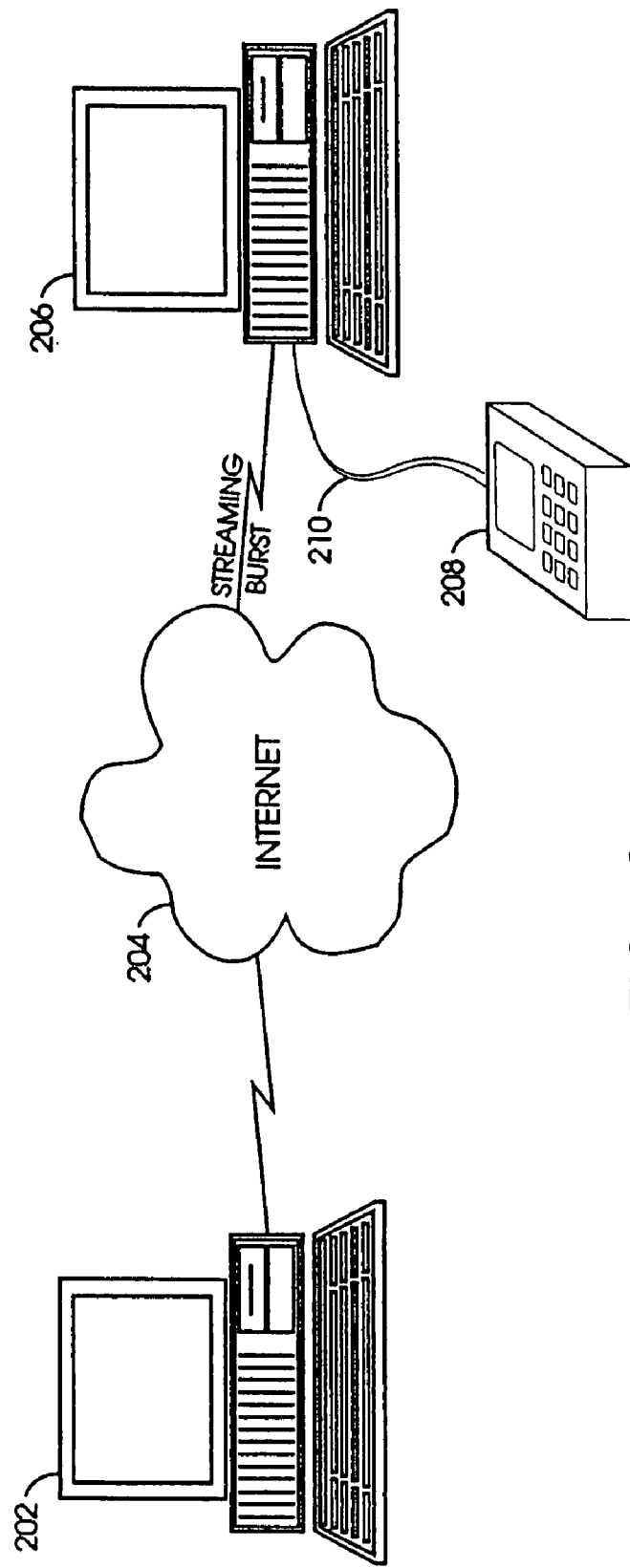
FIG. 2 illustrates an embodiment of an existing media distribution system.

FIG. 2 illustrates an embodiment of the system illustrated in FIG. 1. Thus, a computer 202, such as, for example, a personal computer running the Microsoft Windows NT Version 4.0 operating system and having a 300-MHz Intel Pentium processor, 64 MB of RAM (random access memory) and 4.8 GB of hard disk storage, executes media server 102 software such as, for example, RealServer by RealNetworks, Inc. The hard disk storage of the computer 202 includes media storage 104 and the media object 106. The computer 202 is connected to the Internet 204 and World Wide Web.

Another computer 206, having the same characteristics as the computer 202, executes media player software, such as, for example, RealPlayer by RealNetworks, Inc. operating as a plug-in or helper application of a web browser such as, for example, Netscape Communicator. Thus, the computer 206 operates as a non-portable media player 110. The computer 206 is connected to the Internet 204 by, for example, a 28.8 kbps modem using a standard telephone line.

A portable media player 208 is connected to the computer 206. The portable media player 208 has local, non-volatile storage such as, for example, a flash memory. The portable media player 208 also includes a microprocessor and user controls. In addition, the portable media player 208 includes a speaker or other mechanism for reproducing audio information and possibly a display screen for reproducing video information or a graphical image. Examples of such a portable media player include Rio by Diamond Multimedia or Audible MobilePlayer by Audible Corporation.

Generally, the computer 206 communicates through the Internet 204 with the computer 202 to request and receive media clips 106. The computer 206 may use either a streaming transmission protocol 112 or a FTRRD transmission protocol 114 to receive the media clip. Using the FTRRD transmission protocol 114, the computer 206 can store the media clip 106 and transmit it via a data communication line 210 to the portable media player 208.

A content provider operating media server software 102 on the computer 202 may not, however, wish to allow the media clip 106 to be accessed using both a streaming transmission protocol 112 and a FTRRD transmission protocol 114. A content provider may, for example, wish to have users accessing a media clip 106 view advertising information encountered each time the user accesses the content provider's web site (one example of a content providing system). Existing systems do not offer content providers a convenient way to restrict access to certain media clips 106 to only a streaming transmission protocol 112, while allowing other media clips 106 to be selectively enabled for access via a FTRRD transmission protocol 114. The present invention advantageously provides that capability to content providers.

Figure 3:
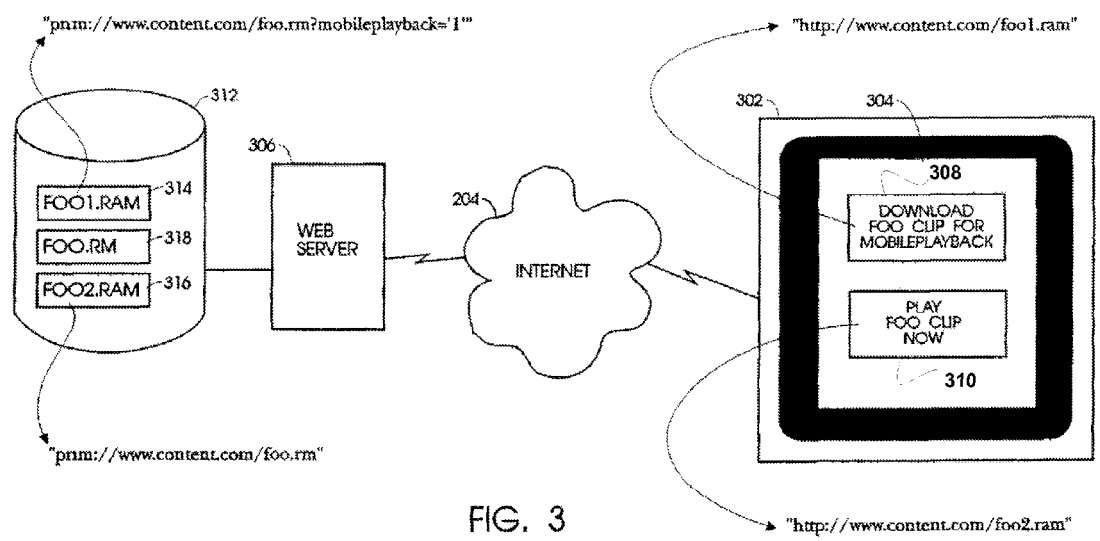
FIG. 3 illustrates an embodiment of the present invention wherein a user accesses a media file via the Internet.

FIG. 3 illustrates an embodiment of the present invention wherein a user accesses a media file via the Internet 204. A user operating a web browser on a computer 206 views a screen display 302 which displays a web page 304. The web page 304 is one of possibly many served to users by a web server 306. In one embodiment, the web server 306 may be the Apache Web Server running on a computer having the hardware characteristics of the computer 202 described in relation to FIG. 2.

The web page 304 includes a download hyperlink 308 and a play hyperlink 310. The download hyperlink 308 has an associated URL of "http://www.content.com/foo1.ram". As will be appreciated by those of ordinary skill in the art, the URL references a file called "foo1.ram" on a web site having a domain name "www.content.com" using the hypertext transport protocol ("http"). Similarly, the play hyperlink 310 has an associated URL of "http://www.content.com/foo2.ram". That URL references a file called "foo2.ram" on a web site "www.content.com."

A computer readable storage 312, which is accessible by the web server 306, includes a media object called "foo.rm" 318. The computer readable storage 312 also includes a foo1.ram file 314 and a foo2.ram file 316, both of which reference the foo.rm media object 318. The foo1.ram file 314 includes a URL of "pnm://www.content.com/foo.rm?mobileplayback='1'." The foo2.ram file 316 includes a reference to a URL of "pnm://www.content.com/foo.rm". As will be immediately appreciated by those of ordinary skill in the art, the "pnm://" portion of the URL indicates a particular protocol. In one embodiment of the present invention, "pnm" refers to a flow control protocol used to transmit data of a media object 106. Further appreciated will be the use of a parameter following the '?' character in a URL string as well as the user of many parameters separated by the '&' character. For example, date and user parameters are specified in the following URL string:

"http://www.abc.com/webpage.htm?date='01/20/98'&user='RacerX'"

In one embodiment of the present invention, the "mobileplayback" parameter, when set to '1' indicates that an associated media object is being accessed for FTRRD mode transmission. Another access parameter is "streamanddload" which indicates that both a stream transmission and a FTRRD transmission happen simultaneouslyXthe stream transmission typically at a lower bit rate than the FTRRD transmission. Thus, a ".ram" file may be created whose contents include a URL string specifying a protocol (e.g., "pnm://"), a media object (e.g., "www.content.com/foo.rm"), and an access parameter (e.g., "?streamanddload='1'").

It will be appreciated by those or ordinary skill in the art that files compliant with SMIL (Standardized Multimedia Integration Language) may also be referred to by hyperlinks. It will be similarly appreciated that SMIL files (typically having the extension ".smi") can reference a media object 318. One example of a SMIL file has a file name of "foo.smi" and includes the following tags:

```
<smil>
  <head>
    <layout>
      <root-layout height="320" width="320" background-color="black"/>
      <region id="images" left="40" top="40" height="240" width="240"/>
    </layout>
  <head>
  <body>
    <seq>
      <par>
        <img src="titanic.rp" region="images"/>
        <audio src="foo.rm" clip-end="2.25 min"/>
      </par>
    </seq>
  </body>
</smil>
```

In the above example, the "src" parameter of the "<audio" tag specifies the media object 318, namely "foo.rm".

Figure 4:
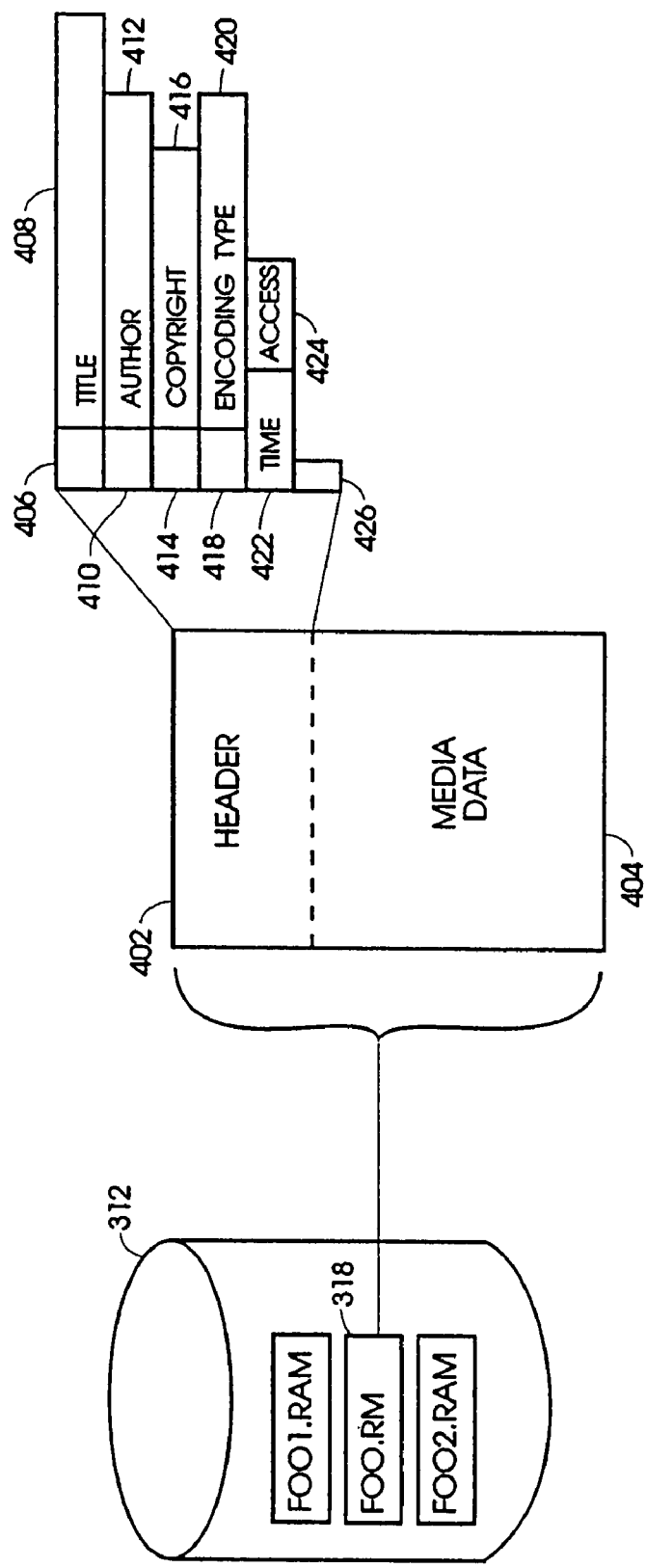
FIG. 4 illustrates information encoded in a media file in accordance with an embodiment of the present invention.

FIG. 4 illustrates information encoded in a media file in accordance with an embodiment of the present invention. In particular, the foo.rm media file 318 includes a header 402 and media data 404. In one embodiment of the present invention, the header 402 is a variable length header, including multiple fields, some of variable length, some of fixed length. In one embodiment, the length (in bytes) of the variable length fields is indicated by a 2-byte length value in each such field preceding the actual data of the field. Thus, in accordance with that embodiment, a value of a two-byte field 406 indicates the length (in bytes) of a title field 408, which specifies a title associated with the media file 318. A value of another two-byte field 410 indicates the length of an author field 412, which provides the name of an author associated with the media file 318. Likewise, a value of a two-byte field 414 indicates the length of a copyright field 416, and a value in another two-byte field 418 indicates the length of an encoding type field 420. The encoding type field 420 specifies a particular encoder or encoding technology used to encode the media data 404.

A 4-byte fixed length field 422 holds a value which indicates, in tenths of a second, the playing time of the media file 318. Another fixed length field 424 of 128 bits holds a value indicating the type of accesses permitted for the media file 318. In one embodiment, three bits represent a value from 0-4 and are encoded in a particular manner (described in more detail below) within the 128-bit fixed length field 424.

In accordance with this embodiment, the three bits represent the value 0 (zero) to indicate that the media file 318 is enabled to be transmitted to a media player using a streaming transmission protocol 114 only. The streaming transmission protocol is the default protocol. If the value of the three bits is 1 (one), then the media file 318 is enabled for streaming transmission and also enabled for a media player to store the media file on local storage (i.e., record the media file) during the streaming transmission. If the value of the three bits is 2 (two), then the media file 318 is enabled for transmission in FTRRD mode. If the value of the three bits is 3 (three), then the media file 318 is enabled for simultaneous FTRRD and streaming transmission and is also enabled for storage during streaming (recording). If the value of the three bits is 4 (four), then the media file 318 is enabled for simultaneous FTRRD and streaming transmission. In the simultaneous FTRRD and streaming transmission, the media server transmits the media file 318 to the media player in two different streams; namely, in a typical embodiment, a lower bit rate stream (typically played for the user) and a higher bit rate stream (typically received and stored on local storage at a rate faster than real time playback).

An end of header indicator (EOH) 426 marks the termination point of the header 402. The end of header indicator 426 is, in one embodiment, a single byte set to the value 255. As will be appreciated by those of ordinary skill, additional fields could be included in the header 402.

Figure 5:
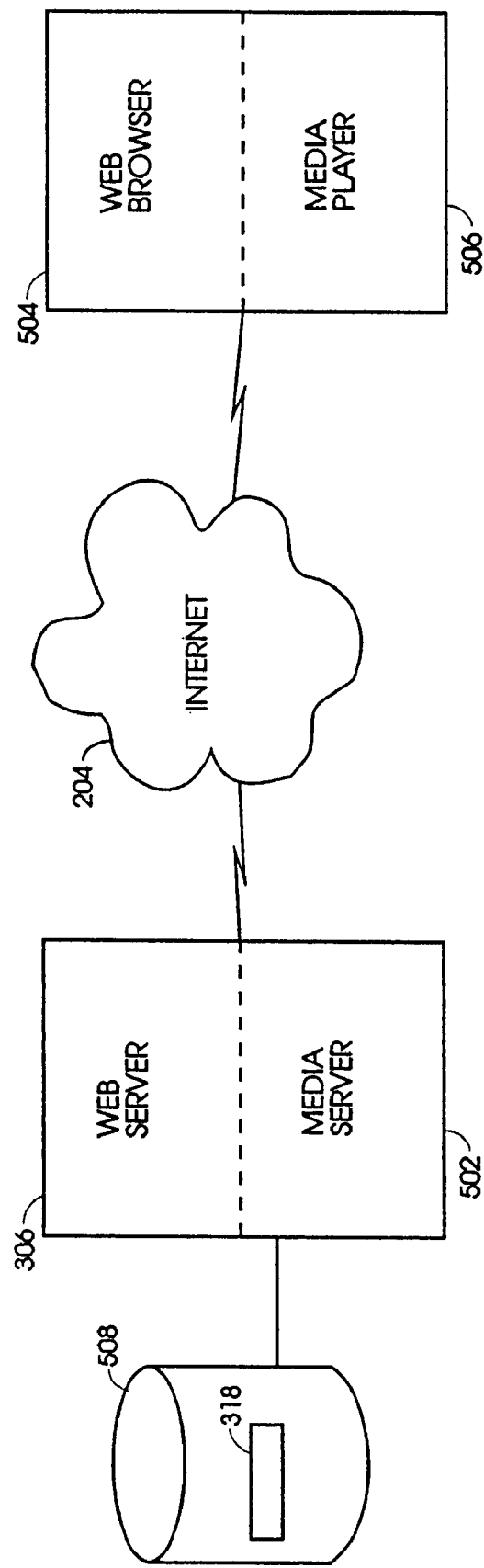
FIG. 5 illustrates components of a system in accordance with an embodiment of the present invention.

FIG. 5 illustrates components of a system in accordance with an embodiment of the present invention. The web server 306 is connected to the Internet 204. The web server 306 communicates with a media server 502 such as, for example, RealServer by RealNetworks, Inc. The web server 306 and the media server 502 may run on a single computer or may run on different computers connected in any manner wherein a program running on one can send messages to a program running on the other. One such connection could be, for example, a LAN. The media server 502 is connected to the media storage 508. The media storage device 508, in one embodiment a 4.8 GB hard drive, includes the media file 318.

A web browser 504 is connected to the Internet 204: The web browser 504 communicates with a media player 506 such as, for example, RealPlayer by RealNetworks, Inc. As those of ordinary skill in the art will appreciate, the web browser and the media player may run on a single computer having hardware characteristics similar to those of the computer 202 described in connection with FIG. 2. The web browser 504 may, in one embodiment, be Netscape Communicator 4.07.

Figure 6:
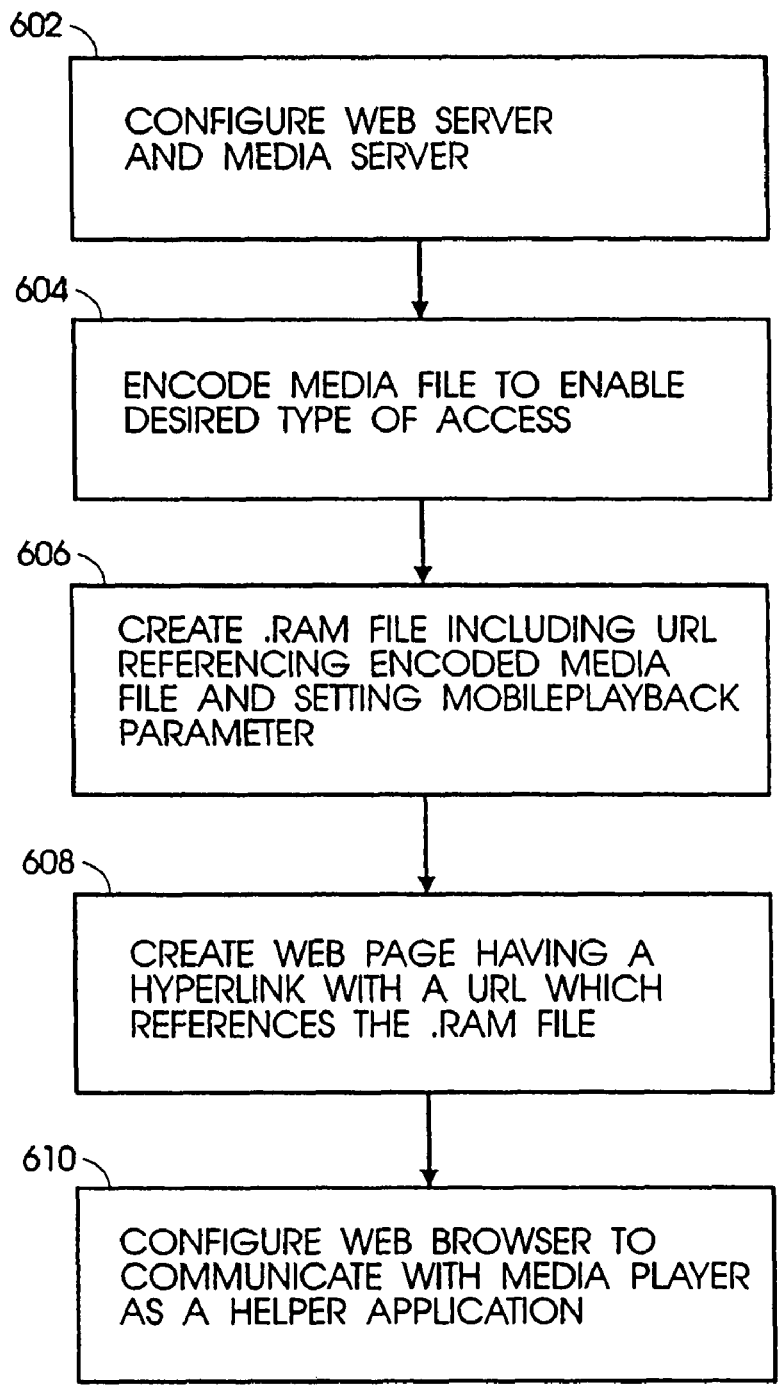
FIG. 6 illustrates steps to configure components in one embodiment of the present invention to operate in accordance with the present invention.

FIG. 6 illustrates steps to configure the embodiment illustrated in FIG. 5 to operate in accordance with the present invention. In the first step 602, a content provider or other user configures the web server 306 and media server. The web server 306 has an associated configuration file. Among certain options, the web server 306 configuration file includes a broadcast port specification. In one embodiment, the web server 306 configuration file specifies a broadcast port 80 through which the web server 306 transmits information to and receives information from the Internet 204. In the context of the Internet, a port is a numerical identifier normally provided with an IP address which is used by TCP/IP (transmission control protocol/internet protocol) to direct data to a particular application. Generally, port 80 is reserved for HTTP (hypertext transport protocol).

Similarly, the media server 502 has an associated configuration file. The media server configuration file specifies a broadcast port 7070 through which the media server 502 sends information to and receives information from the Internet 204. Those of ordinary skill will be readily familiar with broadcast port numbers and will understand that the web server 306 ignores data communicated through a broadcast port different than the one assigned to it.

In one embodiment of the present invention, a startup script specifies that both the web server 306 and the media server 502 be started as services by the Windows NT operating system when the operating system starts up.

The web server 306 is further configured to recognize a MIME (multipurpose Internet multimedia extensions) type by which it determines that responses to requests for particular media files are to be handled by the media player 506. In one embodiment of the present invention, the web server 502 transmits the content of a ".ram" file, the content being a URL referencing a file of MIME type RM (e.g., a file called "foo.rm"), in response to a user request, and the web server 502 expects that the media player 506 will receive and process the URL. It will be readily appreciated by those of ordinary skill that the present invention is not limited by any particular MIME type. Generally, files associated with the RM MIME type comprise audio, video, image, or text information, or some combination of those.

Figure 7:
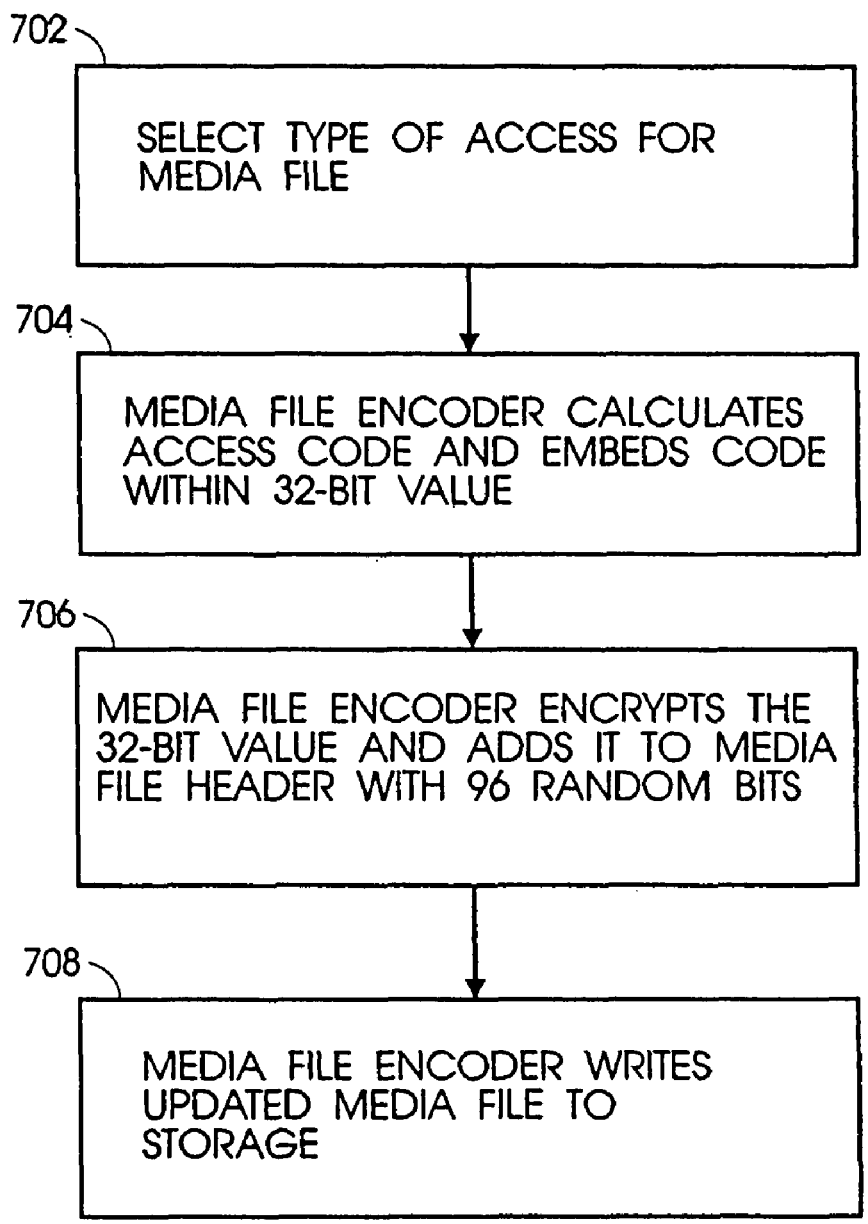
FIG. 7 illustrates steps in one embodiment of the present for encoding a media file.

In a next step 604, a content provider or other user encodes a media file of MIME type RM with an access enable code. FIG. 7 illustrates steps in one embodiment of the present for encoding a media file 318. In a first step 702, a user starts a media file encoder program which displays an option menu listing types of access for a media file. The options include: stream, stream and record while streaming, faster than real time reliable download (FTRRD), simultaneous stream and FTRRD and record while streaming, and simultaneous stream and FTRRD. In one embodiment, the menu is implemented as a pull-down list box. In the step 702, the user selects one of the options from the option menu.

In a next step 704, the media file encoder calculates an access code to correspond with the selected menu option. In one embodiment, 0 (zero) corresponds to stream, 1 (one) corresponds to stream and record while streaming, 2 (two) corresponds to faster than real time reliable download (FTRRD), 3 (three) corresponds to simultaneous stream and FTRRD and record while streaming, and 4 (four) corresponds to simultaneous stream and FTRRD. The media file encoder uses three bits to encode the access code value. The media file encoder, in the step 704, places the three bits as the lowest order (least significant) bits in a 32-bit field, and generates 29 additional bits at random to fill the 29 higher order bit positions in the 32-bit field:

In another step 706, the media file encoder encrypts the 32-bit field. In one embodiment, the media file encoder uses a private key protocol such as DES (digital encryption standard) wherein both the media file encoder and a decoding entity such as, for example, the media player 506, share a private key. Once the 32-bit field is encrypted, the media file encoder, in the step 706, adds the encrypted 32 bits to an additional 96 bits generated at random to create a 128-bit field which is added to the header of the media file 318.

As those of ordinary skill in the art will appreciate, updating a variable-length header of a file is well known in the art. Thus, the media file encoder opens the media file, reads the header into application memory, generates the 128-bit field as described, and inserts the 128-bit field into the header data in the application memory. Many techniques exist for modifying and replacing information in a file, and the present invention is not limited by any such technique. In a step 708, the media file encoder writes the updated media file to storage.

With respect to FIG. 6, in a further step 606, a content provider or user creates a file having an extension of ".ram". The ".ram" file includes a URL which references the encoded media file 318. The URL in the ".ram" file includes a specified value for the "mobileplayback" parameter. One example of the URL is "pnm://www.content.com/foo.rm?mobileplayback='1'". As will be appreciated by those of ordinary skill, parameters generally follow a "?" symbol in a URL specification. The "mobileplayback" parameter, when set to 1 (one), indicates that the intended access of the media file (e.g., "foo.rm") is by FTRRD transmission. An additional parameter that could be included in the URL is "streamanddload='1'" which indicates that the intended access of the media file is simultaneous stream and FTRRD transmission.

In a step 608, the content provider or other user creates a web page having a hyperlink which references the ".ram" file. As will be readily appreciated by those of ordinary skill, a hyperlink refers to a link to another Internet-based document encoded using tags defined by the HTML (hypertext markup language) standard. One example of HTML coding to specify a hyperlink is:

<A HREF="http:://www.content.com/foo.ram">PREVIEW OF TITANIC</A>.

When a user of the web browser 504 accesses a web page having such a hyperlink, the browser interprets the hyperlink to display the text "PREVIEW OF TITANIC" and responds to a user's mouse click on the text "PREVIEW OF TITANIC" by submitting a request to the Internet to access the file specified by the HREF parameter of the HTML tag: <A HREF="http:://www.content.com/foo.ram">. Thus, when a user clicks on a hyperlink having a URL which references the ".ram" file, the web browser 504 submits a request that the contents of the ".ram" file be transmitted back to the web browser 504.

In a next step 610, the web browser 504 is configured to communicate with the media player 506 as a helper application or plug-in. In particular, the media player 506 is associated with the MIME type RM. Thus, when the web browser 504 detects a URL specifying a file of MIME type RM (e.g., the file has an extension ".RM"), the web browser 504 launches the media player 506, if it is not already running, and passes the specified URL to the media player 506 as a parameter. Generally, the use of plug-in applications to enhance the capabilities of web browsers via defined MIME types is well known in the art.

Figure 8A:
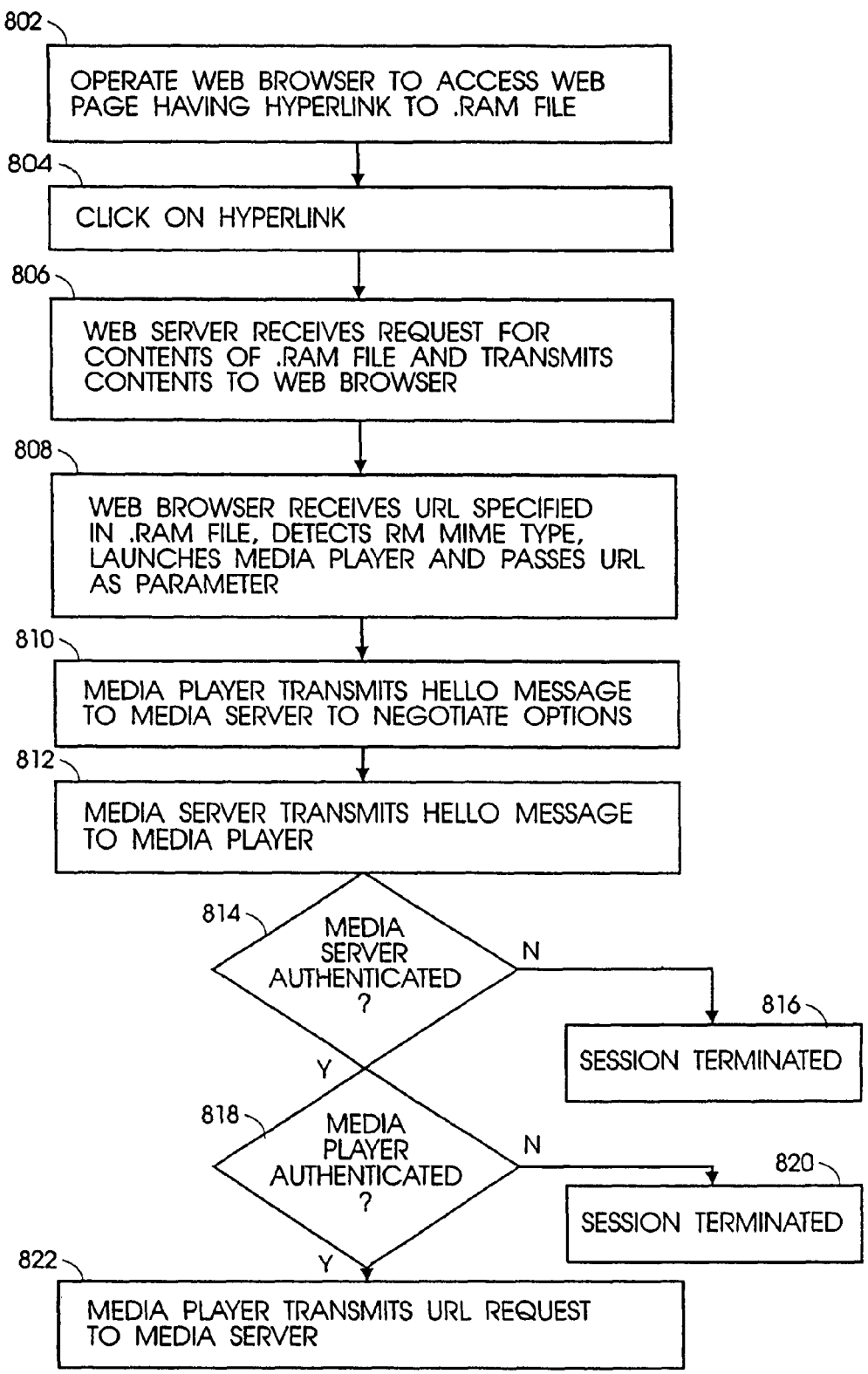
FIGS. 8A and 8B illustrate steps in accordance with one embodiment of the present invention for transmitting a media object in accordance with a predefined type of access to the media object.

FIG. 8A illustrates steps in accordance with one embodiment of the present invention for transmitting a media object in accordance with a predefined type of access to the media object. In a first step 802, a user operates the web browser 504 to access a web page having a hyperlink associated with a media object, the hyperlink referencing a ".ram" file. To access the web page, the user may enter the URL associated with the web page by typing the URL in a text field of the web browser 504 using a keyboard. One example of such a URL is "http://www.content.com". After entering the URL, the user presses the ENTER key on the keyboard to cause the web browser 504 to issue the request for the web page to the Internet. The web server 306 receives the request and begins transmitting the web page to the web browser 504.

In a next step 804, the web browser 504 displays the web page, and the user clicks on the hyperlink associated with a desired media object. In response, the web browser 504 issues a request to the Internet for the URL associated with the hyperlink.

In another step 806, the web server 306 receives the request for the contents of the ".ram" file associated with the hyperlink and transmits the contents of the ".ram" file to the web browser 504.

In a step 808, the web browser receives the URL string specified in the ".ram" file. A user agent component of the web browser 504 scans the URL string and determines that the URL string references a file having an extension of ".rm".

The user agent of the web browser 504 (1) matches the extension to one of a list of stored extensions and determines that the extension corresponds to a RM MIME type; (2) determines that the media player 506 is a plug-in associated with the RM MIME type; and (3) launches (causes the execution of) the media player 506. The web browser 504 further passes the URL string specified in the ".ram" file to the media player 506 as a parameter.

In a further step 810, the media player 506 begins executing and transmits a hello message to the media server 502. The hello message includes data values for certain communication options which the media player 506 can support. Each option, in one embodiment, includes an integer identifier specified in 8 bits, followed by either a predetermined number of fixed bits corresponding to the option number or a length value in decimal bytes indicating the length of the remaining data in the option. One option identifies a protocol to use for transmitting the media object (e.g., UDP or TCP), another refers to the bandwidth of the media player's network connection, and another option specifies the media player's 506 maximum bandwidth. Another option represents an authentication challenge to the media server 502 to enable the player to determine whether the media server 502 is produced by a particular manufacturer or is somehow incompatible with the media player 506. In the step 810, the media player 506 also transmits a media player ID string to the media server 502. The media player 506 ID string is an underscore-delimited ASCII string, formatted according to the following: platform_version_player_type_id_language_processor. One example of the ID string is "win95_3.24.1_plug32_rpla_EN_686".

In a step 812, the media server 502 responds to the media player 506 hello message by transmitting its own hello message to the media player 506. The media server 502 hello message includes an authentication response and also an authentication challenge to the media player 506. In one embodiment of the present invention, the media server's 502 authentication response is indicated by initial bits corresponding to the "#" character, followed by a two-byte length field set to the value 64, followed by 64 bytes of data. In one embodiment, the 64 bytes of data indicate a particular manufacturer and version number associated with the media server 502.

In a step 814, the media player compares the media server's 502 authentication response to predetermined responses which the media player 506 expects to encounter. In an alternative embodiment, the server's authentication response is encrypted in accordance with a predetermined encryption scheme. In that embodiment, the media player 506 decrypts the 64-byte authentication response data in accordance with the predetermined encryption scheme and then determines whether the decrypted authentication response data matches an expected response. If, in the step 814, the media player determines that the media server's 502 authentication response is not one of the expected responses, then, in a step 816, the media player 506 terminates the communication session and displays a message to the user indicating that the media player 506 cannot work with the media server 502.

If, however, in the step 814, the media player authenticates the media server 502, then, in a step 818, the media player 506 transmits an authentication response to the media server 502 to comply with the media server's 502 authentication challenge to the media player 506. In the step 818, the media server 502 determines whether the media player's 506 authentication response matches one of a predetermined number of expected responses. If, in the step 818, the media server 502 determines that the media player's 506 authentication response does not correspond to any expected response, then in a step 820, the media server terminates the communication session.

If, however, in the step 818, the media server authenticates the media player 506, then, in a further step 822, the media player 506 transmits a URL request to the media server 502. The URL corresponds to the media object (e.g., a media file) 318 stored on the media storage 508.

In a step 824 (FIG. 8B), the media server 502 transmits a file header 402 of the media file 318 to the media player 506. In a further step 826, the media player 506 receives the data of the media file header and stores the header data in a buffer.

In a further step 828, the media player 506 scans the header data stored in the buffer to determine whether the media player 506 is capable of decoding the media data 404. In particular, the media player accesses the encoding type field 420, in one embodiment, by referencing the associated 2-byte length field 418 and extracting the indicated number of bits from the header immediately following the length field 418. In the step 828, the media player 506 thus determines the encoding technology used to encode the media data 404, and determines if it is capable of decoding the media data 404. In one embodiment, the media player 506 compares the extracted bits of the encoding type field to values in a first column of a multiple row table, wherein each row corresponds to encoding/decoding technology supported by the media player 506. If the extracted bits match one of the values in the first column, then the media player 506 determines, in the step 828, that it can decode the media data 404, otherwise the media player 506 determines that it cannot decode the media data 404, and, in a step 830 the media player 506 terminates the session.

If, however, in the step 828, the media player 506 determines that it can decode the media data of the media file 318, then, in a next step 832, the media player 506 determines whether the media file 318 is enabled for the intended type of access to the media file 318. More particularly, the media player 506 extracts 128 bits from the buffered header data which correspond to the 128-bit fixed length field 424 of the file header 402. The media player 506 further extracts the lower order (least significant) 32 bits of the 128 bits and uses a private key (matching that used by the media file encoder) to decrypt the 32 bits. The media player 506 then, in a step 832, checks the lower order (least significant) three bits to determine whether the value represented by the three bits (i.e., the access code) permits the intended access to the media file 318.

Figure 8B:
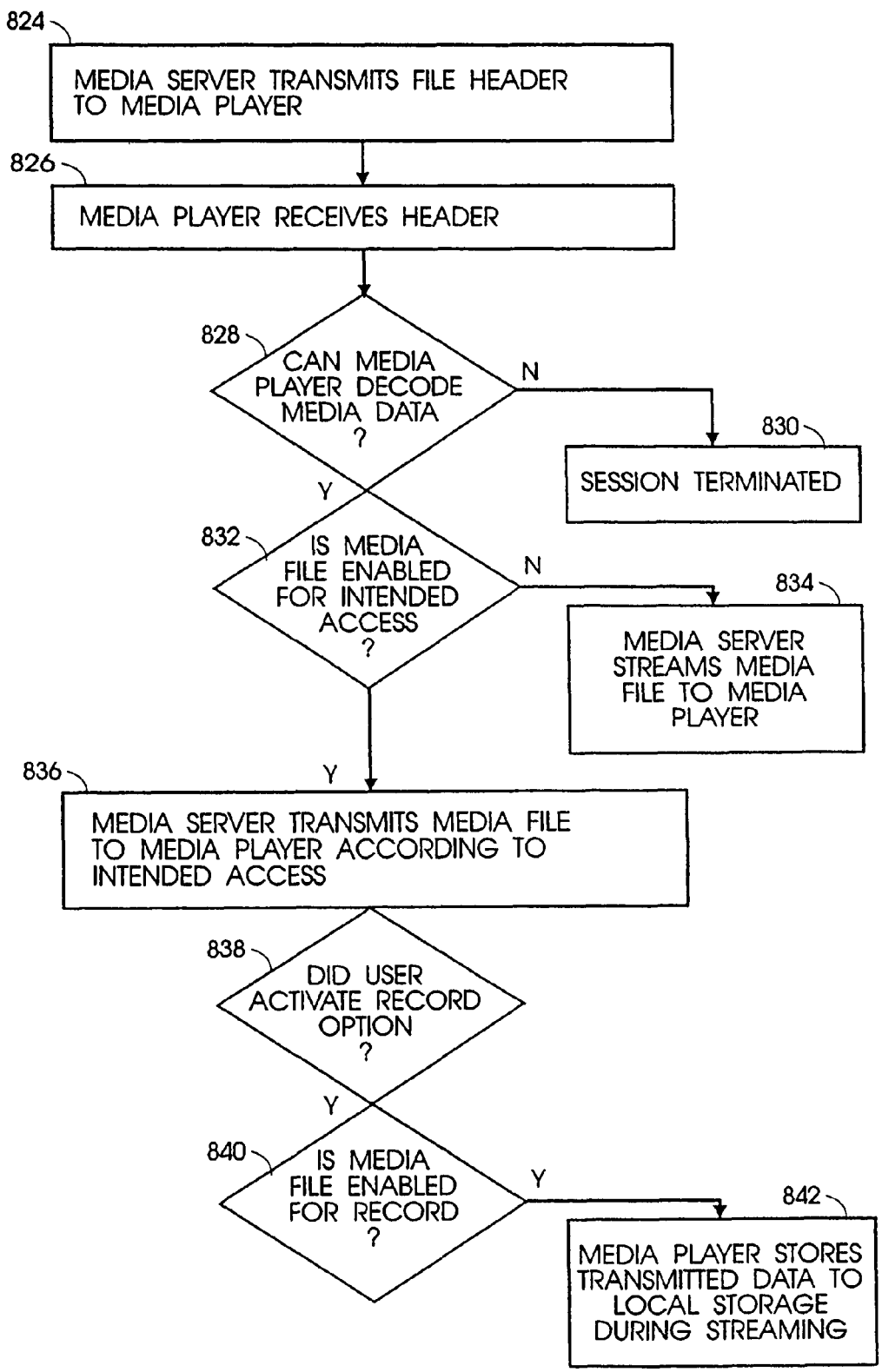

In one embodiment of the present invention, if the intended access is streaming transmission, then the media player 506 checks for an access code of 0, 1, 3 or 4. In an alternative embodiment, as illustrated in FIG. 8B, the media player 506 does not check whether the media file 318 is enabled for streaming transmission when streaming transmission is the intended type of access. In that alternative embodiment, streaming transmission is treated as a default condition.

If the intended access is FTRRD transmission, then the media player 506 checks for an access code 2, 3, or 4. If the intended access is simultaneous stream and FTRRD transmission, then the media player 506 checks for an access code of 3 or 4. If the media player 506 determines that the access code is not one which permits the intended access, then, in a step 834, the media server 502 transmits the media data of the media file 318 in a streaming transmission, and the media player 506 begins receiving and playing the media data (rendering video or sound information).

If, however, in the step 832, the media player 506 determines that the access code permits the intended access, then, in a step 836, the media player 506 sends a request message to the media server requesting that the server transmit the media data of the media file 318 according to the intended access. The media server 502 begins transmitting the media data of the media file 318 in accordance with the desired access. In one embodiment, the media server 502 uses TCP protocol to transmit media data in response to a request for a FTRRD transmission. When the transmission of the media data is complete, and if the type of transmission resulted in the media player storing the media data locally, the media player 506 may transfer the media data to a portable media player such as that described in relation to FIG. 2.

In the case where the media server 502 transmits the media data in both streaming and FTRRD transmission protocols, the media player 506 and media server 502 use two ports, one for streaming transmission and the other for FTRRD transmission. In one embodiment, a port number 7071 is used. By default, the media player 506 and media server 502 use the port number one greater than the initially configured port when a second port is needed. Further, in one embodiment of the present invention, a second instance of the media player is launched to receive and process data received over the second port.

When the media player 506 receives media data in a streaming transmission, then, in a step 838, the media player 506 monitors the status of a user selectable record option. In one embodiment, the record option is a command button of the media player 506 user interface labelled "RECORD". If, in the step 838, the media player 506 detects that the user has clicked on the record command button, then, in a step 840, the media player 506 again checks the access code to determine whether the media file 318 is enabled for recording access. More particularly, the media player 506 checks the access code for values 1 or 3, and, if the access code is 1 (one) or 3 (three), then, in a step 842, the media player 506 begins storing the received media data on local storage during the transmission of the media data. If the access code is not 1 or 3, then the media player 506 does not record (i.e., store) the streamed media data.

The present invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A method for creating a controlled access media file, comprising:
    storing media data on a computer readable medium; and
    storing a header on the computer readable medium, the header including access code bits representing a value configured to control transmission of the media data according to at least one transmission protocol;
    wherein the access control code bits are encrypted and wherein the value is determined by decrypting the access code bits.

2. The method for creating a controlled access media file of claim 1, wherein the at least one transmission protocol includes a streaming protocol.

3. The method for creating a controlled access media file of claim 1, wherein the at least one transmission protocol includes a faster than real time transmission protocol.

4. The method for creating a controlled access media file of claim 1, wherein the at least on transmission protocol includes a recording protocol.

5. The method for creating a controlled access media file of claim 1, wherein the at least one transmission protocol includes a protocol allowing storage of the media data in a non-volatile computer readable medium.

6. The method for creating a controlled access media file of claim 1, wherein the access code bits represent a value configured to prevent transmission of the media data according to at least one non-authorized transmission protocol.

7. A method for creating a controlled access media file, comprising:
    storing media data on a computer readable medium;
    storing access control code bits on the computer readable medium, the access control code bits representing a transmission value indicating the media data may be transmitted according to one or more transmission protocols; and
    storing rights data on the computer readable medium, the rights data indicating rights related to the media data.

8. The method for creating a controlled access media file of claim 7, wherein the access control code bits represent a value indicating the media data may not be transmitted according to a second transmission protocol.

9. The method for creating a controlled access media file of claim 7, wherein the one or more transmission protocols according to which the media data may be transmitted includes a streaming protocol.

10. A method for regulating the transmission of media data, the method comprising:
    transmitting a request for a media file by a computer, said media file comprising said media data and a transmission value, and said transmission value indicating at least one desired transmission protocol;
    receiving said transmission value by the computer;
    determining by the computer whether said transmission value permits said media file to be transmitted in accordance with at least one requested transmission protocol; and
    transmitting by the computer a request to transmit said media data.

11. The method of claim 9, wherein said determining whether said transmission value permits said media file to be transmitted in accordance with at least one requested transmission protocol comprises:
    receiving at least one parameter value, said at least one parameter indicative of at least one requested transmission protocol;
    and determining whether said at least one requested transmission protocol is in accordance with said parameter value.

12. The method of claim 10, wherein said determining whether said at least one requested transmission protocol is in accordance with said transmission value comprises:
    decrypting at least a portion of a header of said media file, said header comprising encrypted access code bits indicative of said transmission value; and comparing said transmission value to a value corresponding to said at least one requested transmission protocol.

13. The method of claim 9, wherein said transmission value is indicative of at least one undesired transmission protocol.

14. The method of claim 12, wherein at least one undesired transmission protocol comprises a recording protocol.

15. The method of claim 12, wherein at least one undesired transmission protocol comprises a protocol including storage of the media data in a non-volatile memory.

16. The method of claim 9, wherein said transmission value is indicative of at least two undesired transmission protocols.

17. A method for creating a controlled access media file, comprising:
storing media data on a computer readable medium; and
storing a header on the computer readable medium, the header including access code bits representing a value configured to control transmission of the media data according to at least one transmission protocol;
wherein the at least one transmission protocol includes a faster than real time transmission protocol.

18. A method for creating a controlled access media file, comprising:
storing media data on a computer readable medium; and
storing a header on the computer readable medium, the header including access code bits representing a value configured to control transmission of the media data according to at least one transmission protocol;
wherein the at least on transmission protocol includes a recording protocol.

19. A method for creating a controlled access media file, comprising:
storing media data on a computer readable medium; and
storing a header on the computer readable medium, the header including access code bits representing a value configured to control transmission of the media data according to at least one transmission protocol;
wherein the access code bits represent a value configured to prevent transmission of the media data according to at least one non-authorized transmission protocol.

20. The method for creating a controlled access media file of claim 7, wherein the one or more transmission protocols according to which the media data may be transmitted includes a faster than real time transmission protocol.

21. The method for creating a controlled access media file of claim 7, wherein the one or more transmission protocols according to which the media data may be transmitted includes a recording protocol.

22. The method for creating a controlled access media file of claim 7, wherein the one or more transmission protocols according to which the media data may be transmitted includes a protocol including storage of the media data.

* * * * *